United States Patent [19]

Amos

[11] Patent Number: 4,639,034
[45] Date of Patent: Jan. 27, 1987

[54] SOFT TOP FOR PICK-UP TRUCKS
[75] Inventor: James Amos, Muncie, Ind.
[73] Assignee: American Insulation & Engineering Co., Inc., Muncie, Ind.
[21] Appl. No.: 730,829
[22] Filed: May 6, 1985
[51] Int. Cl.⁴ .............................................. B62D 25/06
[52] U.S. Cl. .................................... 296/100; 296/105
[58] Field of Search ................. 296/98, 100, 101, 104, 296/105, 171, 175, 43, 109; 49/420–421, 425–426; 160/84 R, 32, 35; 135/88

[56] References Cited

U.S. PATENT DOCUMENTS

| 2,129,893 | 9/1938 | Walden | 296/105 |
|---|---|---|---|
| 2,423,748 | 7/1947 | Acheson | 296/102 X |
| 2,670,988 | 3/1954 | Cook | 296/105 |
| 2,824,764 | 2/1958 | Stirling | 296/105 |
| 3,201,171 | 8/1965 | Wickard | 296/100 |
| 3,606,448 | 9/1971 | Walker | 135/88 X |
| 3,688,787 | 9/1972 | Feather | 296/105 X |
| 3,901,548 | 8/1975 | Seaman, Jr. | 296/100 X |
| 4,035,015 | 7/1977 | Smith | 296/43 X |
| 4,285,539 | 8/1981 | Cole | 296/100 X |

Primary Examiner—Robert B. Reeves
Assistant Examiner—Russell D. Stormer
Attorney, Agent, or Firm—James C. Wray

[57] ABSTRACT

A collapsible soft top for use on pick-up truck cargo compartments is disclosed. The invention consists of a frame and a fabric top. The frame comprises a number of girders and rafters which may be folded up when an open cargo compartment is desired. The frame is covered by a weather resistant, collapsible fabric which provides window means as well as door means.

9 Claims, 7 Drawing Figures

SOFT TOP FOR PICK-UP TRUCKS

BACKGROUND OF THE INVENTION

The invention relates to the field of land vehicle bodies and tops. More in particular, the invention relates to spaced parallel bows which are collapsible. Still more in particular, the invention relates to collapsible soft tops for pick-up truck cargo compartments.

The field of art to which this invention pertains has examples of folding canvas tops with frame members. However, there is a need in the art for a collapsible top for pick-up truck cargo compartments which is strong, durable, weather resistant, easy to assemble, adjustable for different size cargo compartments, capable of being sold to the public in a kit such that any lay person can assemble the invention, and capable of collapsing without disassembling.

SUMMARY OF THE INVENTION

The invention comprises a convertible soft top for pick-up truck cargo compartments. There is a frame and a fabric covering. The frame is constructed to fit any pick-up truck cargo compartment. In addition, the frame and its fabric covering are constructed such that one may easily collapse the top, not top to bottom as a conventional convertible top, but from back to front in an accordion-like fashion.

The frame has bottom horizontally oriented girders providing the support and foundation for the vertical loads provided by the rafters. The girders are comprised of telescoping subsections such that they may adjust to the length of the cargo compartment to be covered. Preferably, the girders are permanently secured to the top of the side walls of the cargo compartment. The girders have means to receive and removably secure rafters.

The rafters are attached to the girders and support the fabric covering. There are at least two rafters necessary for the top and preferably three or more. One rafter is situated at the front of the cargo compartment adjacent the truck cab rear window. This rafter is not removable but preferably permanently secured to the front end of the girders. This rafter forms a frame for a window provided in the fabric covering this portion of the top. This front rafter is bolstered in its vertical orientation by struts which are preferably permanently secured to the girders.

There is a back end rafter situated over the tailgate or back end of the cargo compartment. This rafter is removably secured to the back end of the girders. This rafter provides a frame for a door located in the fabric covering this portion of the top. Like the front rafter, this back rafter also is supported in its vertical orientation by struts. However, since this back rafter is removable, so also are the struts. These struts are turnbuckles and adjust the tension in the fabric covering, in essence stretching out the fabric.

Interposed between the front and back rafters are intermediate rafters removably attached to the girders. The front, back and intermediate rafters are all parallel to each other in their vertical orientation.

One of the key features of the invention is the removability of the rafters from the girders such that they may be collapsed, back to front, and secured, along with the fabric covering, to the front rafters. This removability is preferably due to independent vice grips located on the girders for receiving the rafters and a notch or hole in the girders for receiving the turnbuckles.

The rafters comprise telescoping subsections such that they may accommodate any cargo compartment width.

Each telescoping subsection of the frame is provided with means for securing the telescoped parts such that they may not slide upon having been extended to the length necessary as dictated by the dimensions of the truck cargo compartment. Such means can be simple set screws.

The back and front end rafters are provided with means for receiving a fabric covering, such that the covering may be stretched taut over the frame and provide a weather resistant cover. Such means for receiving the fabric covering may be snaps, and/or a channel. The channel or groove is adapted to receive an end seam of the fabric shaped in the configuration of a bead.

The rafters may be constructed out of any lightweight, durable material which is capable of being molded or welded. Such materials can be polyvinyl chloride or lightweight metallic alloys containing aluminum. The turnbuckles may be constructed out of any hardened steel. The fabric covering may be constructed out of any weather resistant fabric capable of being folded or collapsed. Such materials may be vinyl or oilcloth. The fabric covering may have transparent areas for windows and doors as well as zippers and snaps to open said windows and doors. The fabric covering may be completely transparent, completely opaque, or translucent. It is to be understood that the fabric does not necessarily have to be weather resistant. The fabric may be composed of a collapsible screen covering the frame. The fabric covering may be chicken wire or any material whatever which may form an enclosure using the frame as a support.

It is an object of this invention to provide an after market, convertible soft top to be used on pick-up truck cargo compartments.

It is another object of this invention to provide a soft top which is collapsible.

It is another object of this invention to provide a convertible soft top which may be bought as a kit and assembled by anyone capable of reading simple instructions and using simple tools.

It is still another object of this invention to provide a collapsible top which collapses back to front and is capable of being secured in its collapsed form.

These and other objects of the invention will become more evident from the foregoing and ongoing specification and claims.

DESCRIPTION OF THE PREFERRED EMBODIMENT

Figure 1:
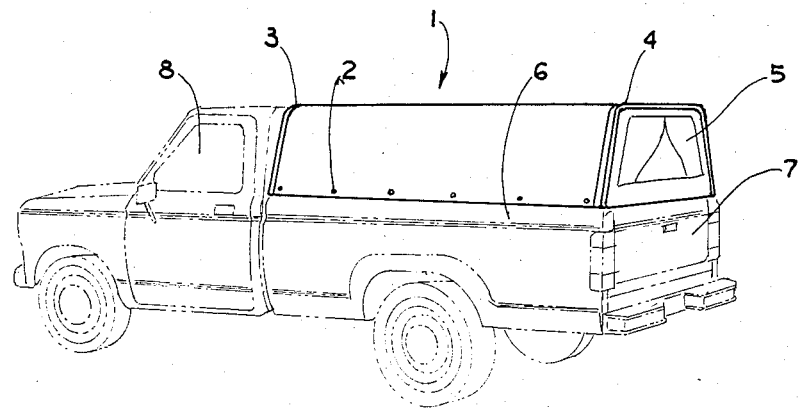
FIG. 1 is a perspective view of a typical pick-up truck with the invention situated thereon.

FIG. 1 shows the invention 1 fully assembled and erect. The invention 1 is situated adjacent pick-up truck cab 8 and resting on cargo compartment side wall 6. There is the front 3 and the back 4. There is window and door means 5 situated over tailgate 7. 2 represents snaps or any means of securing the fabric in a taut fashion.

Figure 2:
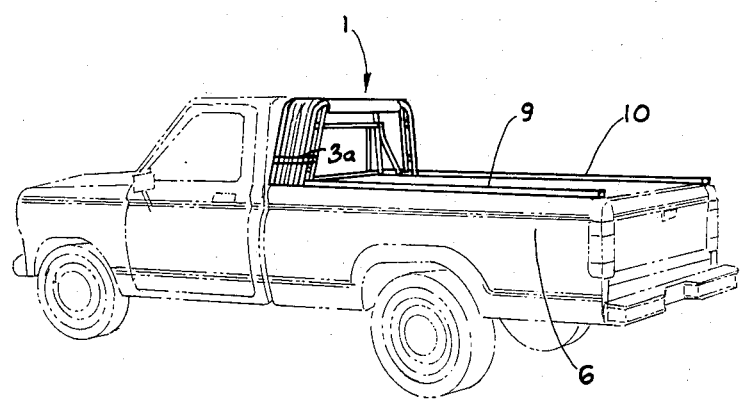
FIG. 2 shows the pick-up truck of FIG. 1 with the invention in its collapsed form.

FIG. 2 shows the invention 1 in fully assembled yet collapsed form. 9 and 10 are the girders. These girders are preferably permanently affixed to the side wall 6. The securing of the girders to the side walls 6 may be done by screws, bolts, clamps or welds. It should be understood that the girders may be completely done away with and the rafters attached directly to the tops of the side walls 6, yet this is not a preferred embodiment because permanent disfigurement to the pick-up truck will occur. The girders 9 and 10 are preferably comprised of telescoping subsections to allow for varying lengths to the pick-up truck cargo compartment side walls.

Figure 3:
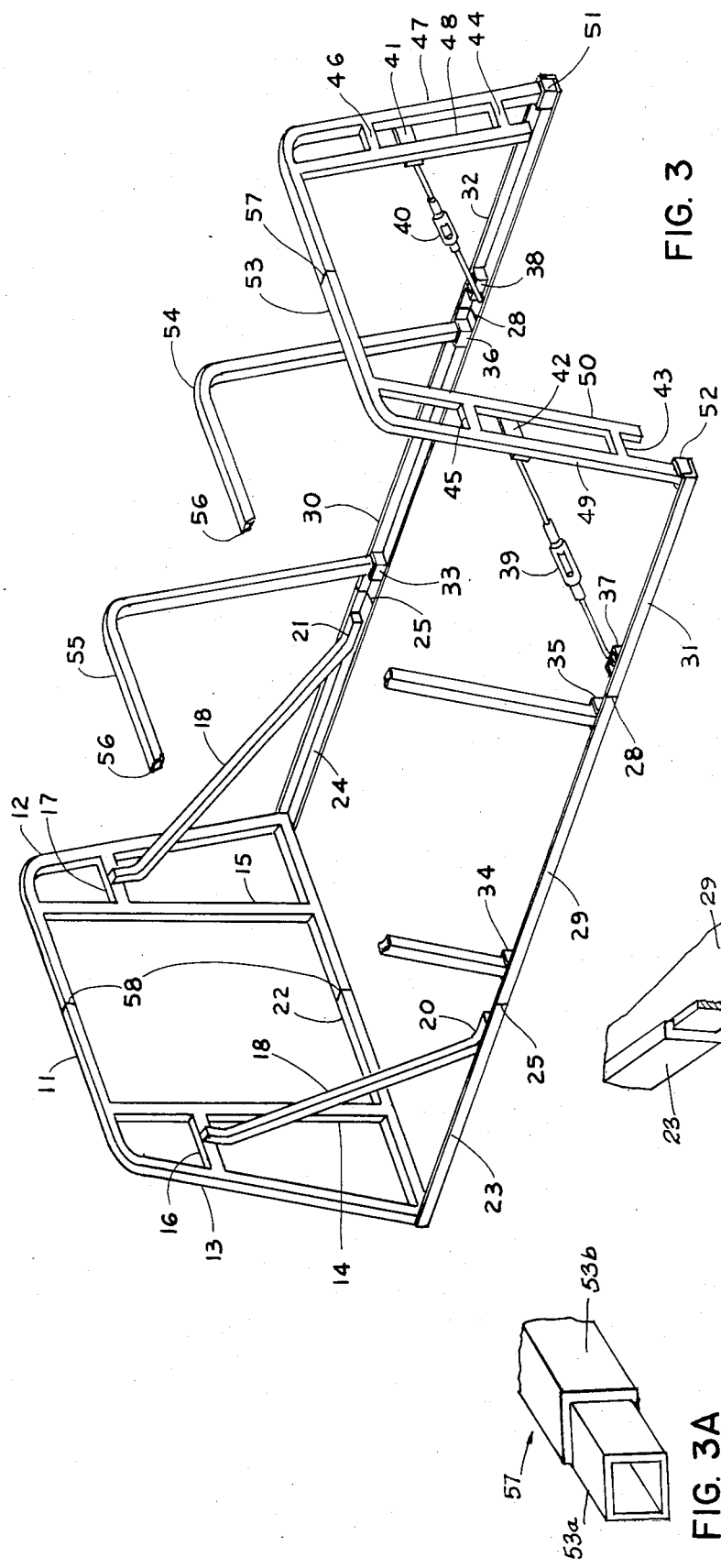
FIG. 3 is a perspective of the frame.

FIG. 3 shows the frame for the invention. There is the front end rafter 11 comprising the top horizontal beam and a bottom horizontal beam 22. These two horizontal beams span the width of the cargo compartment. Side support members 13 and 12 rise vertically from girder sections 23 and 24 connecting the two horizontal beams 11 and 22. Spaced inwardly from side support members 13 and 12 are vertical support members 14 and 15. Horizontal cross pieces 16 and 17 are connected to side supports 13 and 12 and vertical supports 14 and 15 and provide a connection point for struts 18 and 19. Struts 18 and 19 are connected to the girders 23 and 24 at 20 and 21. The front end rafter is comprised of two sections which telescope at points 58. This front end rafter is preferably permanently affixed to girders 23 and 24.

The girders are shown with different numbers to indicate telescoping subsections. For instance, girder 23, 29 and 31 indicate subsections which approximately telescope at points 25 and 28. Girder 24, 30 and 32 likewise telescope at points 25 and 28. It should be noted that the girders may be specifically manufactured in one piece for a specific pick-up truck yet this is not the preferred embodiment.

Figure 4:
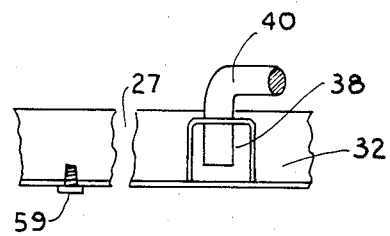
FIG. 4 is an elevated plan view of the receiving means for the turnbuckles.

The back end rafter 53 likewise is composed of two units telescoping at point 57, and comprises a top horizontal beam integral with and connected to side supports 49 and 47 and removably connected to girders at points 52 and 51. It is preferred that the removable connections 52 and 51 are vice grips or their equivalent. (Holes with set screws are contemplated by the term vice grip.) Connected inwardly and parallel to side supports 47 and 49 are inner parallel side supports 50 and 48. Rungs 44, 46, 45 and 43 hold the side supports in their three dimensional configuration. Maintaining the back end rafter in vertical alignment are turnbuckles 39 and 40. The turnbuckles run from turnbuckle connection 42 and 41 situated on the back end rafter to the removable connections situated on girder sections 31 and 32 at 37 and 38. The back end rafter is removable and so also are the turnbuckle struts. FIG. 4 shows how the turnbuckle 40 is connected to the girder 32. The turnbuckle 40 is bent in an L shape to fit into channel 38. Tightening of the turnbuckle will hold the turnbuckle secure. 27 indicates the telescoping point and 59 discloses one way of holding the telescoping sections in permanent or secure alignment.

Referring now to FIGS. 3A and 3B, the telescoping features of the present invention are shown in greater detail. In FIG. 3A, a rafter section is enlarged at the point 58 (although an identical view would be shown at 57) to show a first rafter segment 53a slideably received in a second rafter segment 53b. The two segments can be moved in relation to each other to effect lengthening or shortening of the rafter 53 in typical telescopic fashion.

FIG. 3B is a girder enlarged at the point 25 (although an identical view would be shown at 28) to show girder section 23 telescopically receiving girder section 29.

Figure 5:
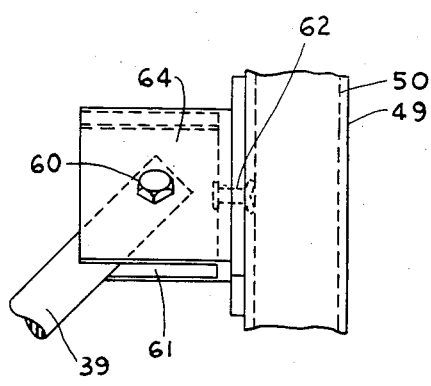
FIG. 5 is a side perspective view of the turnbuckle connection to the back end rafter.
Figure 6:
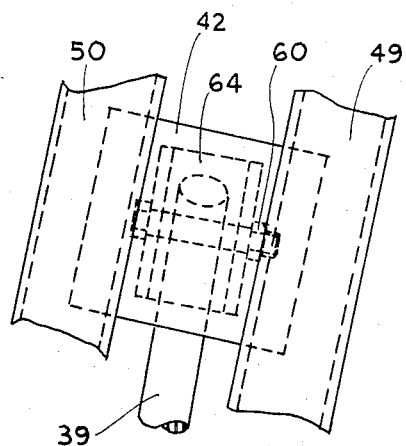
FIG. 6 is an elevated plan view of the turnbuckle connection to the back end rafter.

FIGS. 5 and 6 show how the turnbuckle 39 is connected to the back end rafter side support 49. Referring to FIG. 5, there is side support 49 and inner parallel side support 50. Anchor plate 42 (as shown in FIG. 6) is connected to both side supports 49 and 50. U-shaped stamping or its equivalent 64 is affixed to anchor plate 42 by the connection means 62. Turnbuckle 39 fits within channel 61 and is held secure by securing means 60.

FIG. 6 shows another view of FIG. 5. There are side support members 49 and 50, anchor plate 42, U-shaped member 64, turnbuckle 39 held within U-shaped member 64 by securing means 60.

Figure 7:
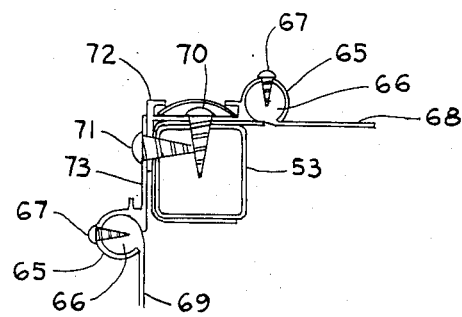
FIG. 7 is a side plan view of the channel receiving means for the fabric covering.

FIG. 7 discloses how the fabric is anchored to both front and back end rafters. Referring to the back end rafter, there is top horizontal beam 53. 72 and 65, and 73 and 65 are the channel means for securing the fabric to the top horizontal beam 53. 66 shows a rounded cross section adapted to receive a fabric end seam bead. 68 and 69 show the fabric extending from channel means 66. 67 are set screws holding the bead firmly. 70 and 71 are set screws holding the channel means firmly to top horizontal beam 53.

Referring back to FIG. 3, intermediate rafters 54 and 55 are shown. They are removably connected to girders at 33, 36, 34 and 35. They are also constructed from two-piece telescoping sections which telescope at point 56. The removable connections 33, 36, 34 and 35 are vice grip connections or their equivalent. Holes or channels with set screws are contemplated by the term vice grip. It should be noted that if the truck cargo compartment is not very long, then the intermediate rafters 55 and 54 are not needed. It could even be the situation that only one intermediate rafter is needed.

It is preferred that all of the frame members, barring the turnbuckles, are constructed out of tubular lightweight aluminum metal alloys. This is because this material may be bent when needed or welded when needed. It is preferred that turnbuckles 39 and 40 are constructed out of hardened steel. It is conceivable that other materials may be used to construct the frame members, such as polyvinyl chloride, steel, wood, or any suitable material capable of handling vertical and horizontal stresses.

Front end rafter 11 provides a frame for window means located on the fabric covering and back end rafter 53 provides a frame for door and window means also located on the fabric covering.

The fabric may be anything which may be draped over the frame and secured thereto which is capable of collapsing along with the intermediate and back end rafter. The fabric may be any cloth or combination thereof as well as wire, meshes or scrims and even architectural fabric, being silicon rubber coated fiberglass.

The fabric may be transparent, opaque or translucent. The fabric may be secured to the front and back rafters by the securing means disclosed in FIG. 7 or it may be simply snapped to the frame. It is conceivable that the fabric may be even permanently affixed to the frame, such as by screws or adhesive bonding. The fabric may be in one or more sections and may cover only a portion of the frame. The frame may be constructed so as to cover only a portion of the pick-up truck cargo compartment.

It is to be understood that the description of the preferred embodiment may be deviated from considerably and still be within the ambit of the invention. That is to say, any collapsible top designed for use on pick-up truck cargo compartments wherein there is at least one fixed rafter with the rest of the rafters being removable and capable of being secured in removed fashion to the fixed rafter along with the covering thereon, will be within the scope and spirit of the invention. Having described my invention as well as setting out how it may be made, I now set out the spirit and scope of my invention as embodied in the ongoing claims.

What I claim as my invention is:

1. A collapsible top for pick-up truck cargo compartments, comprising:
   (a) first and second girders mutually spaced in parallel alignment, each having first and second ends:
   (b) a first end rafter permanently connected to said first ends of said girders, said first end rafter having an outer face and an inner face, said first end rafter having a top and bottom horizontal beam in parallel alignment, said top and bottom beams having first and second ends, said top beam being shorter than said bottom beam, said first end rafter being further provided with first and second ends, said top beam being shorter than said bottom beam, said first end rafter being further provided with first and second side supports connected to said first and second ends of said top and bottom beams, respectively, said first end rafter being further provided with first and second vertical supports connected to said top and bottom beams, said vertical supports being mutually spaced inwardly from said first and second side supports and being perpendicular to said top and bottom means, said first end rafter being further provided with first and second horizontal rods, said first horizontal rod being connected to said first side support and said first vertical support, said second horizontal rod being connected to said second side support and said second vertical support, said first end rafter being further provided with first and second girder sections connected to said inward face, said first girder section connected to said first end of said bottom horizontal beam being in perpendicular alignment therewith, said second girder section connected to said second end of said bottom horizontal beam being in perpendicular alignment therewith, said first end rafter being further provided with first and second struts, said first strut being connected to said first side support and said first girder section, said second strut being connected to said second side support and said second girder section, whereby a frame for a window is defined;
   (c) a second end rafter removably connected to said second ends of said girders, said second end rafter having an inward and outward face, said second end rafter being provided with a top horizontal beam having first and second ends and corresponding in length to said first end rafter's top horizontal beam, said second end rafter further comprising first and second side supports, said first side support connected to said first end of said top beam and removably connected to said second end of said first girder, said second side support being likewise connected to said second end of said top horizontal beam and removably connected to said second end of said second girder, said second end rafter being further provided with first and second inner parallel side supports, said inner parallel side supports having first and second ends, said first end of said first inner parallel side support connected to said top horizontal beam inward from the connection of said first side support, said first inner parallel side support being parallel to said first side support, said first end of said second inner parallel side support connected to said top horizontal beam inward from the connection of said second side support to said top horizontal beam, said second inner parallel side support being parallel to said second side support, said second end rafter being further provided with first and second series of rungs, each rung having first and second ends, said first series of rungs having said first ends connected to said first side support and said second ends connected to said first inner parallel side support, said second series of rungs having said first ends connected to said second side support and said second ends connected to said second inner parallel support, whereby a frame for a door is defined;
   (d) firt and second turnbuckles having first and second ends, said first end of said first turnbuckle being removably connected to said first girder and said second end of said first turnbuckle being pivotally connected to a first series rung, said first end of said second turnbuckle being removably connected to said second girder and said second end of said second turnbuckle being pivotally connected to a second series rung, whereby angular support for said second end rafter is defined;
   (e) intermediate rafters removably connected to said girders, said intermediate rafter located between said first and second end rafters, said intermediate rafters being provided with top horizontal beams corresponding in length to the top horizontal beams of the first and second end rafters and having first and second ends, said intermediate rafters being further provided with first and second side support members each having first and second ends, said first end of said first side support member being connected to said first end of said top horizontal beam and said second end of said first support member being removably connected to said first girder, said first end of said second support member being connected to said second end of said top horizontal beam and said second end of said second side support member being removably connected to said second girder, said intermediate rafters being parallel to each other as well as to the first and second end rafters;
   (f) architectural fabric removably covering said rafters, said fabric having window means located at said frame for a window and door means located at said frame for a door.

2. The device of claim 1 wherein said girders have telescoping subsections, whereby said girders are variable in length.

3. The device of claim 2 wherein said rafters have telescoping subsections, whereby said rafters are variable in length.

4. The device of claim 3 further comprising means for securing said top in collapsed form, whereby once the removable rafters have been disconnected from the girders they may be folded in accordion-like fashion along with the architectural fabric and secured to the first end rafter.

5. The device of claim 4 further comprising means for attaching said fabric to said rafters.

6. The device of claim 5 wherein said means for attaching said fabric is a channel having a narrow opening such that a fabric having an end seam bead may have the bead held securely within the channel with a part of the fabric not included in the seam extending through the narrow opening.

7. The device of claim 5 wherein said means for attaching said fabric comprises snaps.

8. The device of claim 7 wherein said rafters and girders are constructed of a lightweight metallic alloy containing aluminum.

9. The device of claim 8 wherein said architectural fabric further comprises end seams shaped in a bead and conforming to a cross section of a channel for receiving said end seam bead located on said end rafters, and wherein said architectural fabric may be constructed from any suitable weather resistant, foldable material.

* * * * *